United States Patent
Yuki

(10) Patent No.: US 9,342,069 B2
(45) Date of Patent: May 17, 2016

(54) ARTICLE PROCESSING APPARATUS, GENERATION METHOD AND COMPUTER-READABLE STORAGE MEDIUM

(71) Applicant: CANON KABUSHIKI KAISHA, Tokyo (JP)

(72) Inventor: Hiroyuki Yuki, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 57 days.

(21) Appl. No.: 14/273,074

(22) Filed: May 8, 2014

(65) Prior Publication Data
US 2014/0336811 A1  Nov. 13, 2014

(30) Foreign Application Priority Data
May 10, 2013 (JP) ................. 2013-100548

(51) Int. Cl.
| | |
|---|---|
| G06F 7/00 | (2006.01) |
| G05B 19/4093 | (2006.01) |
| G05B 19/19 | (2006.01) |
| G05B 13/00 | (2006.01) |
| G05B 15/00 | (2006.01) |

(52) U.S. Cl.
CPC .......... *G05B 19/4093* (2013.01); *G05B 19/19* (2013.01); *G05B 13/00* (2013.01); *G05B 15/00* (2013.01)

(58) Field of Classification Search
CPC ......... G05B 13/00; G05B 15/02; G05B 19/19
USPC ............ 700/213, 245, 246, 250, 253, 302; 901/9; 706/25; 703/2
See application file for complete search history.

(56) References Cited

U.S. PATENT DOCUMENTS 8,972,057 B1 *  3/2015  Freeman ............... B25J 9/1666
700/246

FOREIGN PATENT DOCUMENTS

| JP | 07-210586 A | 8/1995 |
| JP | 2001-195112 A | 7/2001 |

OTHER PUBLICATIONS

Applegate, et al., "TSP Cuts Which Do Not Conform to the Template Paradigm", Computational Combinatorial Optimization, (2001), pp. 261-303.

(Continued)

*Primary Examiner* — Mark Beauchaine
(74) *Attorney, Agent, or Firm* — Canon U.S.A., Inc. IP Division

(57) ABSTRACT

An article processing apparatus having a movable member for processing an article, includes an information processor configured to generate a transition order of states of the movable member. The information processor is configured to respectively set a plurality of clusters each including, as a plurality of nodes, a plurality of states that the movable member may take, with respect to a plurality of regions of the article, respectively set a plurality of costs with respect to a plurality of combinations of two nodes respectively belonging to two clusters different from each other of the plurality of clusters, and generate the transition order by obtaining, based on the plurality of clusters and the plurality of costs, as a solution of a traveling salesman problem, an order of traveling a plurality of nodes obtained by selecting one node from each of the plurality of clusters.

15 Claims, 5 Drawing Sheets

(56) References Cited

OTHER PUBLICATIONS

Karapetyan, et al., "Lin-Kernighan Heuristic Adaptations for the Generalized Traveling Salesman Problem", European Journal of Operational Research, Feb. 2011, pp. 221-232, vol. 208, Issue 3.

Jonker, et al., "Transforming Asymmetric Into Symmetric Traveling Salesman Problems", Operations Research Letters, Nov. 1983, pp. 161-163, vol. 2, Issue 4.

Behzad, et al., "A New Efficient Transformation of Generalized Traveling Salesman Problem into Traveling Salesman Problem", Proceedings of the 15th International Conference of Systems Engineering, ICSE (2002), pp. 43-46.

Applegate, et al., "Finding Tours in the TSP", tech. Rep. 99885 TR 99-05, (1999), Dept. Comput. Appl. Math, Rice University, pp. 1-11.

* cited by examiner

ARTICLE PROCESSING APPARATUS, GENERATION METHOD AND COMPUTER-READABLE STORAGE MEDIUM

BACKGROUND OF THE INVENTION

1. Field of the Invention

The present invention relates to an article processing apparatus having a movable member for article processing, a generation method of generating a transition order of states of the movable member, and a computer-readable storage medium.

2. Description of the Related Art

Reduction of times for measurements and treatments is an important issue for measurement apparatuses and processing apparatuses. Such measurement apparatuses may include an apparatus configured to measure a plurality of points of a work by moving its movable member (measurement head), for example. Such processing apparatuses may include an apparatus configured to perform processing on a plurality of points of a work by moving its movable member (processing head), for example. Regarding the above issue, a technology has been known which selects a movement path of a movable member to reduce a total movement time thereof for reduction of a measurement time or a processing time (Japanese Patent Laid-Open No. 07-210586 and Japanese Patent Laid-Open No. 2001-195112). Japanese Patent Laid-Open No. 07-210586 and Japanese Patent Laid-Open No. 2001-195112 aim to solve a traveling salesman problem (TSP) where a location where measurement or processing is to be performed is a node, and a time required for movement between nodes is a cost. By solving such a TSP, reduction of a time required for measurement or processing is attempted.

However, the technologies disclosed in Japanese Patent Laid-Open No. 07-210586 and Japanese Patent Laid-Open No. 2001-195112 do not consider a degree of freedom of a state (such as a position and an attitude) of a movable member in article processing such as measurement or treating. More effective transition orders of states of a movable member may differ between a case considering such a degree of freedom and a case not considering it. For that reason, the conventional technology has been insufficient for generation of an effective transition order from a viewpoint of article processing time.

SUMMARY OF THE INVENTION

The present invention provides, for example, a technology, of generating a transition order of states of a movable member, advantageous in article processing time.

According to an aspect of the present invention, there is provided an article processing apparatus having a movable member for processing an article, the apparatus including:

an information processor configured to generate a transition order of states of the movable member, wherein the information processor is configured to:

respectively set a plurality of clusters each including, as a plurality of nodes, a plurality of states that the movable member may take, with respect to a plurality of regions of the article;

respectively set a plurality of costs with respect to a plurality of combinations of two nodes respectively belonging to two clusters different from each other of the plurality of clusters; and generate the transition order by obtaining, based on the plurality of clusters and the plurality of costs, as a solution of a traveling salesman problem, an order of traveling a plurality of nodes obtained by selecting one node from each of the plurality of clusters.

Further features of the present invention will become apparent from the following description of exemplary embodiments with reference to the attached drawings.

DESCRIPTION OF THE EMBODIMENTS

Figure 1:
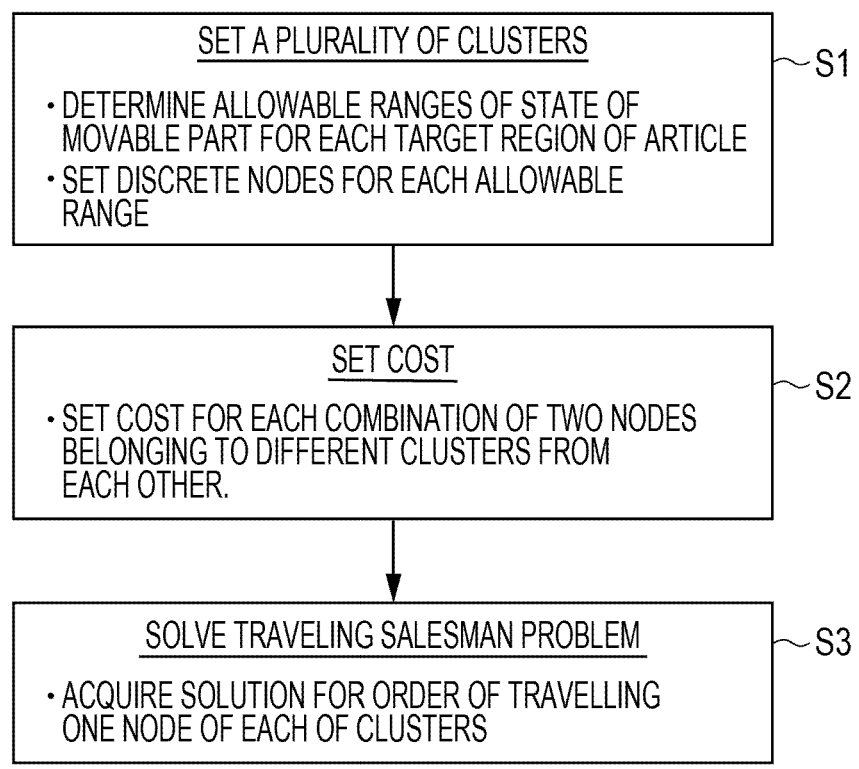
FIG. 1 is a diagram (flowchart) illustrating a flow of information processing of generating a transition order of states of a movable member.

An embodiment of the present invention will be described below with reference to attached drawings. Notably, like numbers refer to like components throughout basically (unless otherwise specified), and a repeated description will be omitted.

First, a narrow (or ungeneralized) traveling salesman problem (TSP) and a generalized traveling salesman problem (GTSP) will be described. Hereinafter, they will collectively simply be called a "traveling salesman problem". A TSP is a problem for obtaining a path that minimizes a sum of costs for making a circuit of (travelling) all nodes only once on a graph on which a plurality of nodes and costs for transitions between the nodes are defined. A solving method such a problem may also be used industrially. For example, Japanese Patent Laid-Open No. 07-210586 and Japanese Patent Laid-Open No. 2001-195112 solve a TSP by defining locations where measurements and/or treatments are performed as nodes and times required for moving between the nodes as costs, as described above. By solving such a TSP, reduction of a time required for measurements or processes is attempted.

Here, TSPs include a symmetric traveling salesman problem (STSP) and an asymmetric traveling salesman problem (ATSP). The STSP is a problem in which costs between nodes have an equal value independent of the direction of movement therebetween, and the ATSP is a problem in which costs between nodes have different values depending on the direction of movement therebetween. An ATSP may be converted to an STSP, as disclosed in Operations Research Letters, Volume 2, Issue 4, November 1983, pp. 161-163. In reality, an ATSP is often converted to an STSP to obtain a solution by using a method of solving (solving method) for an STSP. Notably, methods of solving a STSP include a method of obtaining an exact solution and a method of obtaining a suboptimal solution (quasi-optimal solution). An exact solution is a solution that assures that a sum of costs is a minimum. A quasi-optimal solution is a solution that does not assure that a sum of costs is a minimum but is regarded as that the sum is sufficiently smaller than other solutions and is effective from a practical point of view. A method of obtaining an exact solution is disclosed in Computational Combinatorial Optimization, pp. 261-303, 2001. As a method of obtaining a quasi-optimal solution, heuristic solving methods have been known such as the Lin-Kernighan heuristic disclosed in Tech. Rep. 99885 TR 99-05, Dept. Comput. Appl. Math., Rice University, Simulated Annealing, and a genetic algorithm.

Next, a GTSP will be described. For a GTSP, a plurality of clusters each including (a set of) a plurality of nodes and a plurality of costs respectively corresponding to a plurality of combinations of two nodes respectively belonging to two clusters different from each other are defined on a graph. A GTSP is a problem on the graph for obtaining with respect to the graph a path that provides a minimum sum of cost required for making a circuit of a plurality of nodes, each of which is selected from each of a plurality of clusters only once. A TSP and a GTSP are different in that a TSP path moves through all nodes while GTSP path moves through only one node selected from each of clusters. In other words, they are different in that generation of the order of visiting a plurality of clusters and selection of one node from a plurality of nodes in each cluster are both performed for a minimum cost for travelling. This GTSP solving method may be disclosed in Proceedings of the 15th International Conference of Systems Engineering, ICSE (2002), pp. 43-46 and European Journal of Operational Research, Volume 208, Issue 3, February 2011, pp. 221-232. Proceedings of the 15th International Conference of Systems Engineering, ICSE (2002), pp. 43-46 discloses a method including converting a GTSP to an ATSP. An ATSP may be converted to an STSP in the manner as described above. Solving an STSP obtained by the conversion may result in a solution of the GTSP. Here, it is assured that an exact solution of the STSP is a feasible solution of the original GTSP and is an exact solution of the original GTSP. However, a quasi-optimal solution of the STSP is not assured as a feasible solution of the original GTSP. In other words, a GTSP is a problem that requests a solution for visiting all clusters once, but a quasi-optimal solution of the STSP may possibly include a solution for visiting one cluster a plurality of number of times. Accordingly, European Journal of Operational Research, Volume 208, Issue 3, February 2011, pp. 221-232 discloses a method that is an extension of the Lin-Kernighan heuristic to include a GTSP and directly obtains a quasi-optimal solution of the GTSP without converting the GTSP to an STSP. Next, a configuration example of information processing according to an embodiment will be described.

Configuration Example of Information Processing of Generating Transition Order of States of Movable Member FIG. 1 is a diagram (flowchart) illustrating a flow of information processing according to an embodiment. The information processing is performed in an information processor that generates a transition order of states of a movable member in an article processing apparatus having the movable member for article processing. The information processor includes at least one of a CPU, a memory, a computer and a workstation, for example. Here, the article processing may include at least one of a measurement and a treatment on an article, for example. For example, if the article processing is a measurement, the measurement may apply a measurement head (which may also be called a measurement tool) for an article such as a work. If it is a process, the process may apply a processing head (which may also be called a process tool) for an article such as a work. The movable member may include at least one of a measurement head and a processing head as described above. The movable member may further include a holding unit which holds an article if the holding unit (which may also be called a stage) is movable about a measurement head or a processing head. For such article processing, a plurality of subject regions (which may also be called target regions) of an article are given in advance. A case will be exemplarily described in which a measurement head or a processing head (which may also simply be called a head or tool) is handled as a movable member and the movable member is moved about an article (state transition of the movable member). It should be noted that the present invention is not limited to the case but is also applicable to a case where a holding unit as described above is handled as a movable member and the movable member (article) is moved about the head (state transition of the movable member). A flow of information processing of generating a transition order of states of a movable member will be described with reference to FIG. 1.

First, in step S1, a plurality of clusters are set. The setting may be implemented by determining an allowable range of states of a movable member for each target region of an article and setting discrete nodes for each allowable range. A more specific example thereof will be described below. In step S1, first, an allowable range (which may also simply be called an allowable state range) of states (including positions and attitudes) of a head capable of operating with necessary accuracy on a target region is calculated or obtained. The allowable state range may be determined based on, for example, information (possibly including a design value or a measurement value) at least one of specifications and performance of (a movable member of) an article processing apparatus and a shape and surface property of an article (work).

Each cluster may be set by defining a plurality of discrete points within each allowable state range as described above. Here, a higher number of discrete points (nodes) may be defined within each allowable state range for generation of an optimum transition order from a viewpoint of article processing time even in consideration of a degree of freedom of states (such as attitudes) of a movable member. However, the number may be adjustable in consideration of loads on a calculation process for definition of discrete points and subsequent calculation processes. A method of defining discrete points may possibly include a method of defining discrete points at equal intervals on an n-dimensional space associated with a degree of freedom (=n) of a movable member, for example. However, without limiting to it, various methods are applicable in accordance with at least one of a shape of an article and specifications of a movable member. It should be noted that the allowable state range (or nodes and clusters) should not include a range (node) in which an article and a movable member (head here) or another member (object) interfere. Accordingly, the presence of interference may be checked to exclude such a range or discrete point (node). The check may be performed based on information regarding at least one of specifications and performance of the article processing apparatus and a shape and a surface property of the given article. It should be noted that the check and exclusion processes may be performed before an allowable state range is determined, after an allowable state range is provisionally determined or after discrete points are provisionally set.

Next, in step S2, a plurality of costs are set respectively with respect to a plurality of combinations of two nodes respectively belonging to two clusters different from each other of the plurality of clusters set in step S1. Here, the costs may take a value based on a time required for state transition of a movable member (such as at least one of a head and a stage), for example. However, without limiting to it, the costs may take a value directly or indirectly indicative of a cost for the time or energy required for a transition between states, such as an amount of change between states (amount of displacement), power required for state transition (power consumption), and a heating value in a state transition, for example. The costs may be set in correspondence with a geometrically shortest path (path of transition between states) with not interference or collision between an article and other members (an object such as a head). In order to set a cost based on a time required for a transition between states, a time required for a transition between states may be estimated based on specifications or a characteristic of a control associated with the state transition of a movable member. Acquisition of costs is not required for all of a plurality of combinations of the two nodes. For example, a sufficiently high value may be set for a cost of a combination that is determined as being clearly higher than costs of other combinations or as being higher than a predetermined threshold value, without requiring accurate or detail calculations (estimation). This may reduce a load imposed on the cost setting process. If some state or path of a movable member to be included in a transition order exists in advance, a sufficiently low value (such as zero) may be set for the cost for the combination corresponding thereto.

In next step S3, the transition order of states of the movable member is generated by obtaining, based on the plurality of clusters and the plurality of costs set as described, as a solution of a traveling salesman problem, an order of traveling one node of each of the plurality of clusters. More specifically, first, a GTSP is defined based on the settings in step S1 and S2. Here, the defining process may be based on the defining method disclosed in Proceedings of the 15th International Conference of Systems Engineering, ICSE (2002), pp. 43-46. The defining process may be implemented by defining allowable state ranges as described above as clusters on a GTSP graph, discrete points as described above as nodes on the GTSP graph and costs as described above as costs on the GTSP graph. More specifically, a database compliant with a data format of a solver (solver software) for a GTSP may be generated based on information on the clusters, nodes and costs. In order to convert a GTSP to an STSP and solve it in the manner as described above, a database for the STSP may be constructed or a database for the GTSP may be converted to a database for the STSP. It should be noted that various method of converting a GTSP to an STSP have been known conventionally, and the method is not limited to the aforementioned method.

In step S3, the GTSP defined with the database is continuously solved. In the manner as described above, an exact solution of the GTSP may be obtained by, for example, converting the GTSP to an STSP and using a solver (software tool) configured to execute a solving method like the exact solution method for an STSP disclosed in Computational Combinatorial Optimization, pp. 261-303, 2001. It should be noted that a solving method for obtaining a quasi-optimal solution with a smaller calculation load than a calculation load for obtaining an exact solution. Because a quasi-optimal solution for an STSP converted from a GTSP is not assured as a feasible solution for the original GTSP, a solving method for obtaining a quasi-optimal solution for a GTSP disclosed in European Journal of Operational Research, Volume 208, Issue 3, February 2011, pp. 221-232 may be used to obtain a quasi-optimal solution. The method of solving a GTSP is not limited to those disclosed in the aforementioned non-patent documents but may be any of other known solving method. The solution for the GTSP obtained in this way corresponds to a path (order of state transition of a movable member) with a minimum or quasi-minimum cost that makes a circuit by visiting only one node in each of all clusters. In other words, a path (order of state transition of a movable member) with a minimum or quasi-minimum cost is generated that makes a circuit of an entire target region by selecting and visiting one of selections for a plurality of states (such as positions and orientations) within an allowable state range of a movable member for each target region. That is, the obtained solution gives effective order of state transition of a movable member from a viewpoint of article processing time.

Next in step S3, the obtained solution (transition order of states of the movable member) is output. In this case, the output destination may be at least one of a control unit (which will be described below), a storage unit, another calculating unit, and a storage medium in the article processing apparatus. While the path obtained by solving a GTSP is a round route (cyclic route), a path (transition order) from a starting point to an end point may be output if a cyclic route (returning to the first node or state) is not necessary for some specifications or applications of the article processing apparatus. Here, the starting point and the end point may be determined in the following manner, for example. First, one node of a combination of adjacent nodes (states) having a highest cost in a path (transition order) obtained as a solution may be defined as a starting point, and the other node may be defined as an end point. Thus, an advantageous effect may be expected from a viewpoint of article processing time. Alternatively, a closest node (state) to an initial state of a movable member on a path (transition order) obtained as a solution may be defined as a starting point, and a node (state) having a highest cost required for a transition from the starting point of two nodes (states) adjacent to the starting point may be defined as an end point. Without limiting to the method, various methods of setting a starting point and an end point may be used as required.

Having described an example in which an initial position of a movable member is not included as a node, an embodiment is not limited thereto. For example, a cluster associated with the initial position may be defined. In this case, for a GTSP, a plurality of states (such as attitudes) at an initial position of the movable member may be defined as a cluster. In this case, a solution for the GTSP corresponds to a path (transition order) requiring a minimum or subminimum cost that makes a circuit of all clusters from one node (state) within the cluster as a starting point.

According to the information processing method as described above, there may be provided a technology that generates a transition order of states of a movable member which is effective from a viewpoint of article processing time.

Figure 2A:
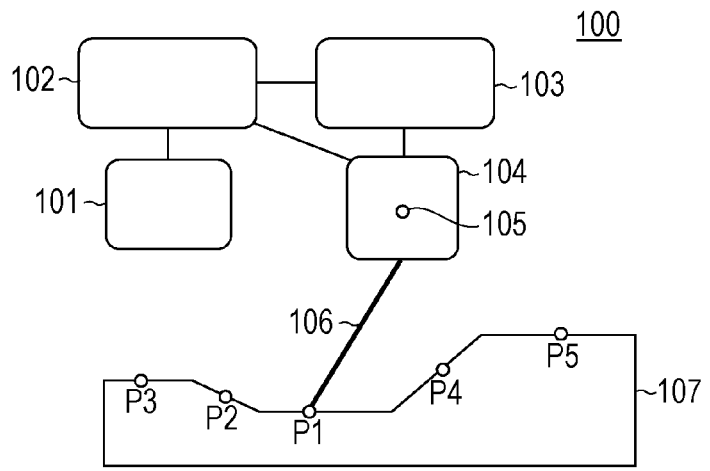
FIGS. 2A to 2C illustrate a configuration example of an article processing apparatus.
Figure 2B:
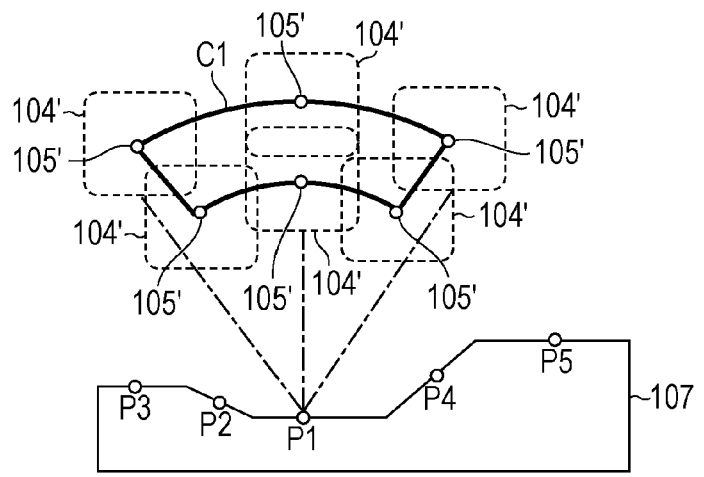
Figure 2C:
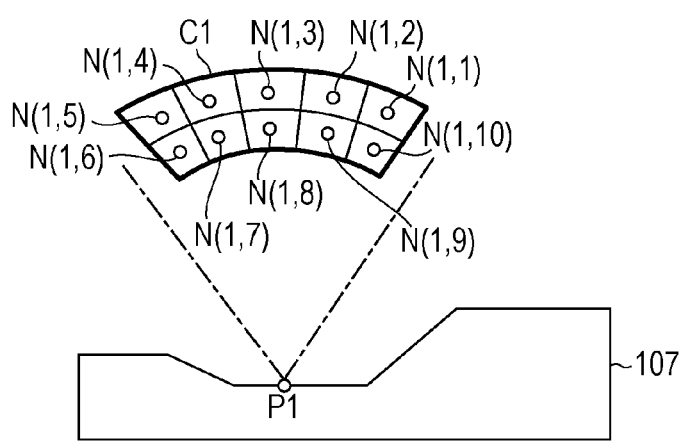

Configuration Examples of Article Processing Apparatus that Executes Information Processing A configuration example of an article processing apparatus that executes the aforementioned information processing method will be described below. FIGS. 2A to 2C illustrate a measurement apparatus serving as a configuration example of the article processing apparatus. While a measurement apparatus will be exemplarily described, it should be apparent to a person skilled in the art that the information processing method is applicable to processing apparatuses and other article processing apparatuses. A measurement apparatus in the following description is of a non-contact type in which a work serving as an article is irradiated with light from a measurement head to measure a property (such as a shape) of the work, but an embodiment of the present invention is not limited thereto. For example, a contact-type measurement apparatus may be applied in which a measurement head (probe) is brought into contact with a work to measure a property of the work. Similarly, if the article processing apparatus is a processing apparatus, it may be a contact type processing apparatus in which a processing head is brought into a work or may be a non-contact type processing apparatus, such as laser processing apparatus, in which a processing head is not brought into contact with a work.

In FIG. 2A, an article processing apparatus (measurement apparatus) 100 includes a control unit 102, a signal processing apparatus 101, a driving unit 103, and a movable member (head) 104. The movable member 104 radiates measurement light 106 to an article (work) 107. The measurement light 106 is reflected by the work 107, and the reflected light is received by the movable member 104. The control unit 102 measures coordinates of a position of a target region of the work 107 or a distance between the target region and the movable member 104 based on information on the received light. The target region may be preset by a user or may be automatically set by the control unit 102. The target regions are indicated by points P1 to P5 as in FIG. 2A but also includes points P6 to P10, not illustrated. For easy description, a state of the movable member 104 is represented by a position (2 degrees of freedom) of a representative point 105 on the drawings. However, in reality, the movable member 104 may have states including attitudes and may have 5 to 6 degrees of freedom attitudes.

Figure 3A:
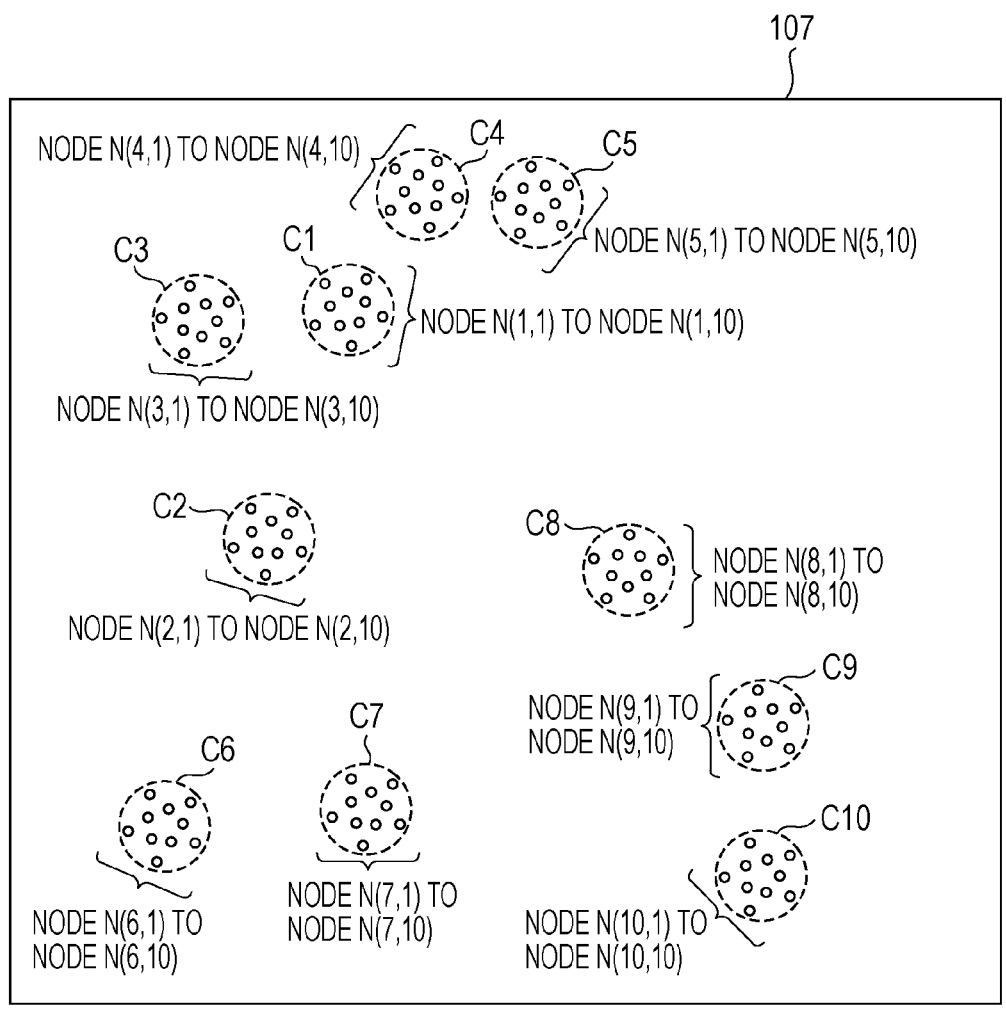
FIGS. 3A to 3C exemplary illustrate details of information processing.
Figure 3B:
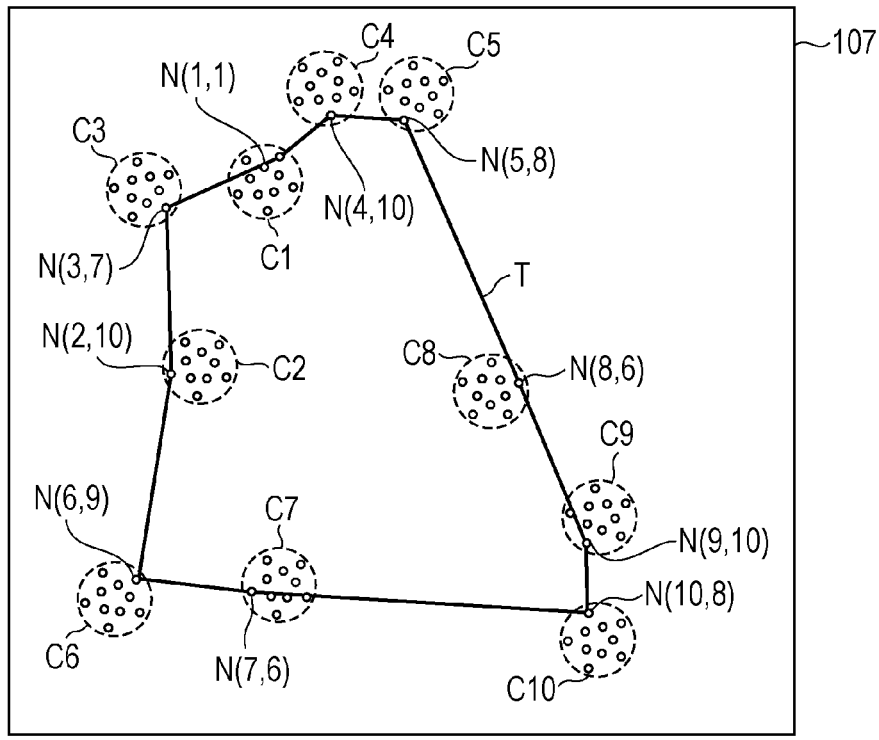
Figure 3C:
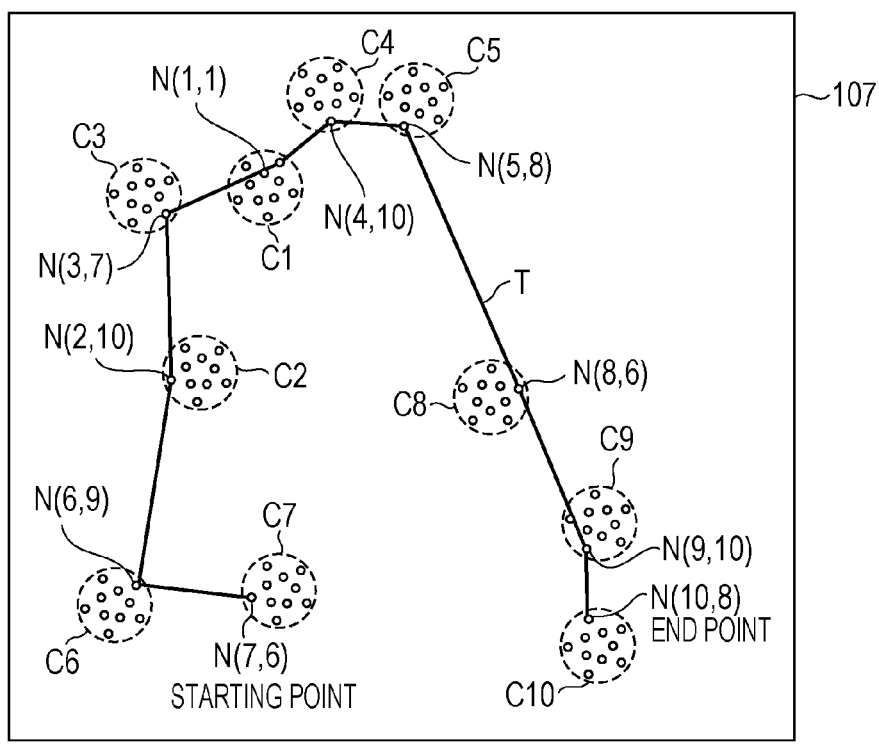

FIGS. 3A to 3C are explanatory diagrams of details of information processing. The information processor 101 executes processes step S1 to step S3 in FIG. 1. FIGS. 2B and 2C and FIGS. 3A to 3C are exemplary diagrams for illustrating details of the processes. Before the processes are executed, the control unit 102 inputs information on a shape of an article, measurement regions (measurement points) P1 to P10, necessary measurement accuracy and so on to the information processor 101 as required. Here, information on a shape of an article may be information on a design value of the article shape or an article shape measured roughly in advance, for example. The information processor 101 defines a range (allowable state range) of states of the movable member 104 which allows measurement with requested measurement accuracy on regions through at least one of a calculation and a user designation. FIG. 2B illustrates a representation of a result of the setting. FIG. 2B illustrates a range (allowable state range) C1 of states (such as positions and attitudes) of the movable member 104 in which the region P1 may be measured with required accuracy. Here, a movable member 104' and a position 105' indicated by broken lines exemplarily represent possible states of the movable member 104 within the allowable state range C1. In a case where measurement using light is performed, its measurement accuracy depends on an incident angle of light on a measurement point. In this case, an arc-shaped outer edge of the allowable state range C1 is obtained from a constraint of the incident angle associated with the region P1 for satisfaction of a required accuracy. Required measurement accuracy may not be satisfied due to an influence of diffraction of light if the distance between the movable member 104 and the article 107 does not fall within the allowable range. Accordingly, an arc-shaped outer edge of an outer side (side away from an article) of the allowable state range C1 is obtained from a constraint of distance for satisfaction of a required accuracy. In this way, the allowable state range C1 is set. For a contact-type measurement, for example, the allowable state range C1 may be set based on information on a constraint of contact angle of a movable member (contact) or a length of the movable member for satisfaction of a required accuracy. The information processor 101 sets an allowable state range for each of the regions.

FIG. 2C illustrates a result of definition of a plurality of discrete points (nodes) in the allowable state range C1. A node N(1, 1) to a node N(1, 10) represent nodes set within the allowable state range C1. Here, a node is denoted by a symbol N(i, j), and N(i, j) indicates the jth node included in an allowable state range for the ith region. According to an example of a method of setting nodes, nodes may be set at equal pitches about an incident angle and at equal pitches about a distance between the movable member and an article. According to another example, nodes may be set at equal pitches for each degree of freedom of a movable member in a coordinate system of an article processing apparatus. The method of setting nodes may allow coverage of an allowable state range with a lower number of points and may vary in accordance with the shape of an allowable state range. Due to space limitations, FIG. 2C illustrates nodes set on a two-dimensional space. However, nodes may be set on a multidimensional (n-dimensional, for example) space based on the n degrees of freedom of states of the movable member 104. For example, instead of the tilting motion or in addition to the tilting motion, the driving unit 103 may cause the movable member 104 to perform a translational motion and a tilting (rotating) motion. The driving unit 103 may cause an internal mirror of the movable member 104 to perform a tilting motion. Thus, states of the movable member 104 may have n degrees of freedom (where n is equal to or higher than 4). Based on this, allowable state ranges and nodes may be set on an n-dimensional space.

FIG. 3A illustrates a result of setting the allowable state ranges C1 to C10 and node N(1, 1) to N(10, 10) for the regions P1 to P10 in the manner described above. FIG. 3A schematically illustrates a setting result viewed down from an upper part to the article 107. As illustrated in FIG. 3A, setting a plurality of nodes within one allowable state range may allow limitation of an infinite number of selections within an allowable state range to a finite number of selections. By selecting a series of nodes from the finite number of selection such that a total cost may be a minimum or a subminimum, an effective transition order of states of the movable member article may be generated from a viewpoint of processing time. In other words, this is a problem for obtaining a path through only one node within each allowable state range to go around (make a circuit (cycle) of) all of the allowable state ranges such that a total cost may be a minimum or a subminimum. For this problem, a solution may be obtained by the following method. That is, a set of nodes belonging to one allowable state range is defined as a cluster. Based on this definition, the problem is for a path for a minimum or subminimum cost through only one node included in each of clusters to make a circuit of the clusters. This is a GTSP disclosed in Proceedings of the 15th International Conference of Systems Engineering, ICSE (2002), pp. 43-46, and a solution for this may be obtained by the various solving method as described above for a GTSP.

In order to obtain a solution for a GTSP, a cost to be set with respect to each combination of two nodes belonging to two clusters different from each other may be given by various methods as described above. It should be noted that a sufficiently high numerical value (such as a numerical value that can be handled substantially as being equivalent to infinity in numerical calculations) may be set for a cost independent of an actual cost, as described above. Also, a sufficiently low numerical value (such as zero or a negative value that can be handled substantially as being equivalent to infinity in numerical calculations if the cost may take a negative value) may be set for a cost independent of an actual cost, as described above. The information processor 101 sets clusters, nodes and costs and solves a GTSP corresponding to the set information to generate an effective transition order of states of a movable member from a viewpoint of article processing time, in the manner described above.

FIG. 3B illustrates a result obtained by solving the GTSP. FIG. 3B schematically illustrates a solving result viewed down from an upper part to the article 107. The obtained path T is a path through one node included in each of clusters to make a circuit of all of the clusters. Thus, a transition order of states of the movable member 104 may be obtained which provides a minimum or subminimum total cost. The information processor 101 outputs the obtained path (transition order) T to the control unit 102.

Having described the example in which the information processor 101 is internally provided in the article processing apparatus 100, an embodiment of the present invention is not limited thereto. For example, an external device corresponding to the information processor 101 may be provided, and information on a path (transition order) T may be input from the external information processor 101 to the article processing apparatus 100 through a storage medium or a communication medium. The path T may not include a starting point and an end point of a state as illustrated in FIG. 3C if the movable member 104 is not required to make a cycle while a cyclic route is provided in the aforementioned example. FIG. 3C illustrates a change to the path T illustrated in FIG. 3B where a node N(7, 6) is defined as a starting point (first state) and a node N(10, 8) is defined as an end point (the last state). In this case, various methods as described above may be applied to determine the starting point and end point.

According to the configurations described above, an article processing apparatus may be provided which generates an effective transition order of states of a movable member from a viewpoint of article processing time.

Concrete Examples of Measurement Apparatus

Figure 4:
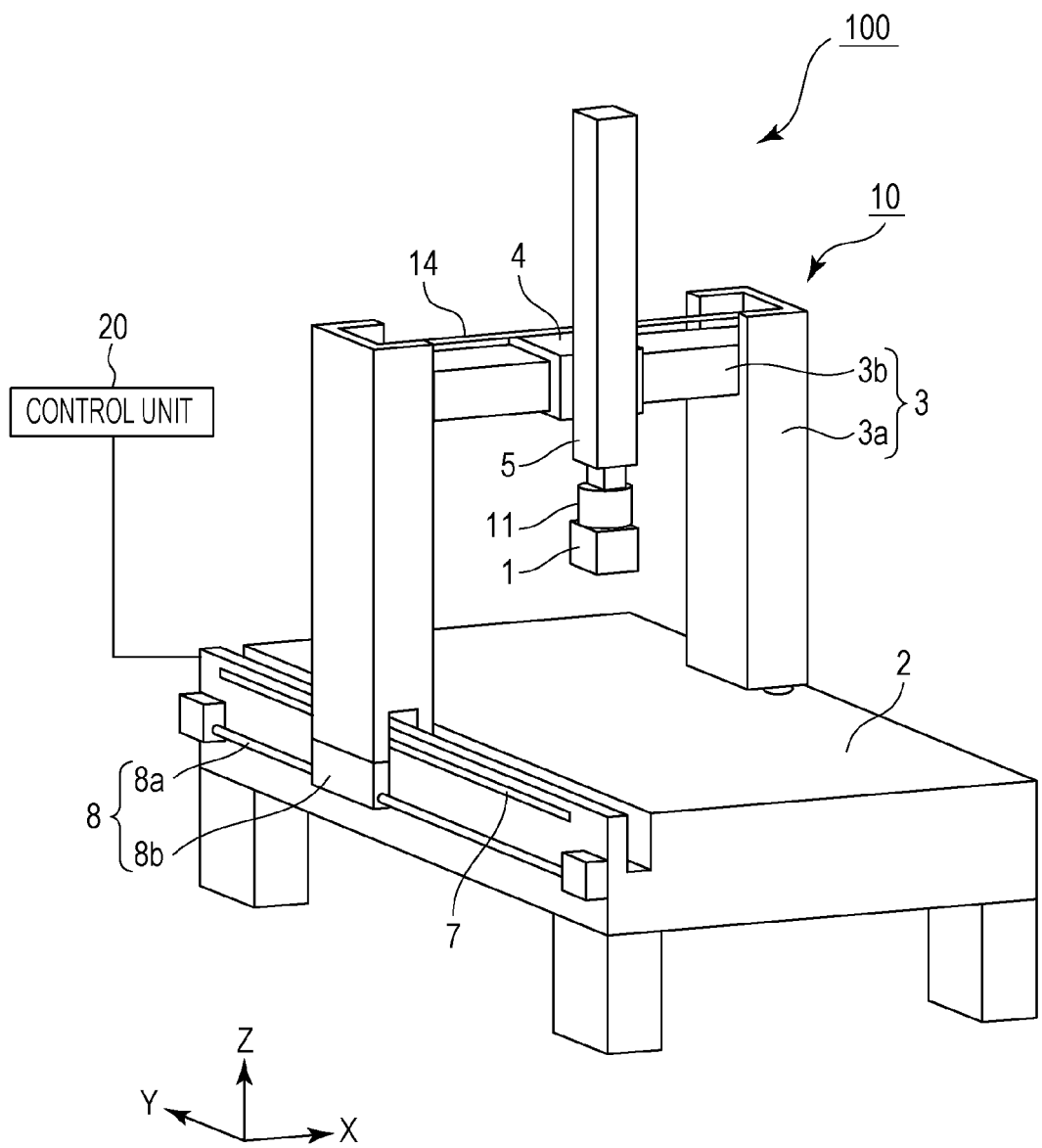
FIG. 4 illustrates a concrete example of a measurement apparatus.

A measurement apparatus 100 serving as a concrete example of the article processing apparatus 100 excluding the information processor 101 in FIGS. 2A to 2C will be described in more detail with reference to FIG. 4. FIG. 4 illustrates a concrete example of the measurement apparatus 100. The measurement apparatus 100 includes a measurement head 1 (corresponding to the movable member 104 in FIGS. 2A to 2C) configured to measure a shape of a subject, a driving unit 10 (corresponding to the driving unit 103 in FIGS. 2A to 2C) configured to drive the measurement head 1, and a control unit 20 (corresponding to the control unit 102 in FIGS. 2A to 2C) configured to control the measurement head 1 and driving unit 10. The measurement apparatus 100 moves the measurement head 1 along a surface (test surface) of a subject such that a constant distance may be kept between the measurement head 1 and the test surface to measure a shape of the subject. The movement may also be called motion or moving and may include not only a change in position but also a change in attitude. The measurement head 1 may apply various measurement methods. For example, a light section method (line light projection type triangulation method), Time Of Flight (TOF) method, an optical interferometry, a probe contact method and so on may be applied, but an embodiment of the present invention is not limited thereto.

A configuration example of the driving unit 10 will be described below. The driving unit 10 may include a surface plate 2 on which a subject is placed, a Y carriage 3, an X slider 4, and a Z spindle 5, and rotary head 11, for example. The Y carriage 3 has a gate shape formed by a pair of legs 3a and an X beam 3b and is supported by the surface plate 2 through an air guide. One leg 3a of the Y carriage 3 includes a Y driving unit 8 configured to drive the Y carriage 3 in a Y direction. The Y driving unit 8 includes a Y shaft 8a provided on the surface plate 2 and a Y movable member 8b provided on the Y carriage 3. Moving the Y movable member 8b along the Y shaft 8a may drive the Y carriage 3 in the Y direction. The X slider 4 is supported by an X beam 3b of the Y carriage 3 through an air guide and includes an X driving unit configured to drive the X slider 4 in an X direction. The X driving unit includes an X shaft 14 provided on the Y carriage 3 and an X movable member provided on the X slider 4. Moving the X movable member along the X shaft 14 may drive the X slider 4 in the X direction. The Z spindle 5 is supported by the X slider 4 through an air guide and includes a Z driving unit configured to drive the Z spindle 5 in a Z direction. The Z driving unit includes a Z shaft provided on the X slider 4 and a Z movable member provided on the Z spindle 5. Moving the Z movable member along the Z shaft may drive the Z spindle 5 in the Z direction. A measurement head 1 is provided at a pointed end of the Z spindle 5 through the rotary head 11. The rotary head 11 may rotate the measurement head 1 about the X axis, Y axis, and Z axis, which may change the attitude of the measurement head 1.

This configuration of the driving unit 10, may allow the measurement apparatus 100 to measure a shape of a subject by changing the position and attitude of the measurement head 1. In this case, the driving unit 10 may include a Y encoder 7 usable for measuring a position of the Y carriage 3 in the Y direction, an X encoder usable for measuring a position of the X slider in the X direction, and a Z encoder usable for measuring a Z spindle in the Z direction, for example. The measurement apparatus 100 may obtain position coordinates of the measurement head 1 from a position of the Y carriage 3 measured by the Y encoder 7, a position of the X slider 4 measured by the X encoder, and a position of the Z spindle 5 measured by the Z encoder. The measurement apparatus 100 may also obtain the attitude of the measurement head 1, that is, the rotation angles of the rotary head 11 about the axes by using a measuring device such as a rotary encoder. Having described the configuration of the measurement apparatus 100 serving as an example of an article processing apparatus, it is given for specific illustration purpose only, and the configuration of the article processing apparatus is not limited thereto. For example, the article processing apparatus may be configured as various processing apparatuses such as a laser processing apparatus, various inspection apparatus such as a nondestructive inspection apparatus, and various lithography apparatus such as a semiconductor exposure apparatus.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment of the present invention, and by a method performed by the computer of the system or apparatus by, for example, reading out and executing the computer executable instructions from the storage medium to perform the functions of one or more of the above-described embodiment. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-100548 filed May 10, 2013, which is hereby incorporated by reference herein in its entirety.

What is claimed is:

1. An article processing apparatus having a movable member for processing an article, the apparatus comprising:
   an information processor configured to generate a transition order of states of the movable member,
   wherein the information processor is configured to:
   respectively set a plurality of clusters each including, as a plurality of nodes, a plurality of states that the movable member may take, with respect to a plurality of regions of the article;
   respectively set a plurality of costs with respect to a plurality of combinations of two nodes respectively belonging to two clusters different from each other of the plurality of clusters; and
   generate the transition order by obtaining, based on the plurality of clusters and the plurality of costs, as a solution of a traveling salesman problem, an order of traveling a plurality of nodes obtained by selecting one node from each of the plurality of clusters.

2. The apparatus according to claim 1, wherein the processing includes at least one of measuring and treating of the article.

3. A generation method of generating a transition order of states of a movable member for processing an article, the method comprising steps of:
   respectively setting a plurality of clusters each including, as a plurality of nodes, a plurality of states that the movable member may take, with respect to a plurality of regions of the article;
   respectively setting a plurality of costs with respect to a plurality of combinations of two nodes respectively belonging to two clusters different from each other of the plurality of clusters; and
   generating the transition order by obtaining, based on the plurality of clusters and the plurality of costs, as a solution of a traveling salesman problem, an order of traveling a plurality of nodes obtained by selecting one node from each of the plurality of clusters.

4. The method according to claim 3, wherein the transition order is generated by determining one of successive two nodes with the highest cost in the solutions as the first state in the transition order and determining the other of the successive two nodes as the last state in the transition order.

5. The method according to claim 3, wherein the processing includes at least one of measuring and treating of the article.

6. The method according to claim 3, wherein each of the plurality of clusters is set so as not to include a node relating to a state, among states of the movable member, in which the article interferes with another object.

7. The method according to claim 6, wherein each of the plurality of costs is set based on at least one of a state change amount and time required for a transition between two of the plurality of states.

8. The method according to claim 3, wherein as the solution, a solution for a generalized traveling salesman problem is obtained.

9. The method according to claim 8, wherein the solution for the generalized traveling salesman problem is obtained by a solving method that gives a quasi-optimal solution.

10. The method according to claim 3, wherein as the solution, a solution for a symmetric traveling salesman problem, obtained by converting a generalized traveling salesman problem, is obtained.

11. The method according to claim 10, wherein the solution for the symmetrical traveling salesman problem is obtained by a solving method assured for giving an exact solution.

12. The method according to claim 10, wherein the solution for the symmetrical traveling salesman problem is obtained by a solving method that gives a quasi-optimal solution.

13. The method according to claim 3, wherein the first state in the transition order is determined based on information of an initial position of the movable member.

14. The method according to claim 13, wherein a state corresponding to, of two nodes adjacent to a node associated with the first state, one with a cost higher than the other for transition thereto from the node associated with the first state one is determined as the last state in the transition order.

15. A computer-readable storage medium that stores a program causing a computer to execute a generation method of generating a transition order of states of a movable member for processing an article, the method comprising steps of:
   respectively setting a plurality of clusters each including, as a plurality of nodes, a plurality of states that the movable member may take, with respect to a plurality of regions of the article;
   respectively setting a plurality of costs with respect to a plurality of combinations of two nodes respectively belonging to two clusters different from each other of the plurality of clusters; and
   generating the transition order by obtaining, based on the plurality of clusters and the plurality of costs, as a solution of a traveling salesman problem, an order of traveling a plurality of nodes obtained by selecting one node from each of the plurality of clusters.

* * * * *